United States Patent
Bakk

(10) Patent No.: US 12,315,531 B2
(45) Date of Patent: May 27, 2025

(54) GRID OF LUMINAIRES

(71) Applicant: Tridonic GmbH & Co KG, Dornbirn (AT)

(72) Inventor: Istvan Bakk, Torokbalint (HU)

(73) Assignee: Tridonic GmbH & Co KG, Dornbirn (AT)

( * ) Notice: Subject to any disclaimer, the term of this patent is extended or adjusted under 35 U.S.C. 154(b) by 165 days.

(21) Appl. No.: 17/910,018

(22) PCT Filed: Feb. 23, 2021

(86) PCT No.: PCT/EP2021/054471
§ 371 (c)(1),
(2) Date: Sep. 8, 2022

(87) PCT Pub. No.: WO2021/180467
PCT Pub. Date: Sep. 16, 2021

(65) Prior Publication Data
US 2023/0123163 A1   Apr. 20, 2023

(30) Foreign Application Priority Data
Mar. 11, 2020 (EP) .................................... 20162327

(51) Int. Cl.
*G10L 25/51*    (2013.01)
*H04R 1/02*    (2006.01)
(Continued)

(52) U.S. Cl.
CPC .............. *G10L 25/51* (2013.01); *H04R 1/028* (2013.01); *H04R 1/406* (2013.01); *H04R 3/005* (2013.01); *H05B 47/12* (2020.01)

(58) Field of Classification Search
CPC ......... G10L 25/51; H04R 1/028; H04R 1/406; H04R 3/005; H05B 47/12
See application file for complete search history.

(56) References Cited

U.S. PATENT DOCUMENTS

2004/0081322 A1* 4/2004 Schliep .................... G08G 1/04
381/94.1
2014/0340222 A1* 11/2014 Thornton ............... G08B 7/066
340/539.17
(Continued)

FOREIGN PATENT DOCUMENTS

WO    2018210588 A1    11/2018
WO    2019115599 A1    6/2019

OTHER PUBLICATIONS

EP 20162327, European Search Report dated Jul. 15, 2020, 7 pages.
(Continued)

*Primary Examiner* — Daniel R Sellers
(74) *Attorney, Agent, or Firm* — Andrus Intellectual Property Law, LLP

(57) ABSTRACT

The invention relates to grid (100) comprising at least one luminaire (101*a-d*), wherein at least one luminaire (101*a-d*) comprises one or more acoustic sensors (105), and preferably other sensors (103, 107); wherein the grid further comprises a controller (109) supplied with the output signals of said sensors (103, 105, 107), wherein the controller (109) is arranged for discriminating different sound categories in the output signals, including human voice sound, and to issue a sensor information signal (130) representing at least the sound category.

11 Claims, 6 Drawing Sheets

(51) Int. Cl.
    *H04R 1/40*           (2006.01)
    *H04R 3/00*           (2006.01)
    *H05B 47/12*         (2020.01)

(56) References Cited

U.S. PATENT DOCUMENTS

| | | | |
|---|---|---|---|
| 2017/0048618 A1* | 2/2017 | Shinotsuka | G01S 1/75 |
| 2017/0070822 A1* | 3/2017 | Skovenborg | H04R 3/005 |
| 2017/0307435 A1* | 10/2017 | Park | G01H 3/125 |
| 2019/0045300 A1* | 2/2019 | Cho | F21K 9/20 |
| 2019/0281681 A1 | 9/2019 | De Bries et al. | |
| 2020/0053857 A1 | 2/2020 | Chen et al. | |
| 2020/0082551 A1* | 3/2020 | Steiner | G06T 7/277 |
| 2020/0357257 A1* | 11/2020 | Pluimers | H05B 47/175 |

OTHER PUBLICATIONS

PCT/EP2021/054471, International Search Report and Written Opinion dated Apr. 7, 2021, 7 pages.

* cited by examiner

GRID OF LUMINAIRES

CROSS REFERENCE TO RELATED APPLICATIONS

The present application is the U.S. national stage application of international application PCT/EP2021/054471 filed Feb. 23, 2021, which international application was published on Sep. 16, 2021 as International Publication WO 2021/180467 A1. The international application claims priority to European Patent Application No. 20162327.9 filed Mar. 11, 2020.

TECHNICAL FIELD OF THE INVENTION

The invention relates to a gird comprising at least one luminaire, to a system comprising a grid of luminaires and to a method for operating such a grid.

BACKGROUND OF THE INVENTION

Many environments, such as buildings, comprise a large grid of luminaires which are distributed in the environment to ensure that every place in the environment can be illuminated adequately, e.g. every room in the building.

It is known to additionally arrange various types of sensors, e.g. motion sensors or noise sensors, in such an environment to collect environmental information, e.g. information about the presence or distribution of people in the environment. This information can be used to control the luminaire grid.

However, it is difficult and costly to distribute, network and power a sufficient number of different environmental sensors in parallel to the luminaire grid.

In addition, many environments, especially offices, comprise rooms in which many people are present at the same time. This can lead to problems with the confidentiality of conversations that might be overheard easily. Especially in open office environments or shared desks, the location of coworkers can change dynamically, which makes it difficult to ensure that confidential information is not shared accidentally. Further, the ambient noise in such an environment, especially human chatter, can cause a distraction.

It is known to use noise dampening or sound masking, for instance by means of white noise sources, to reduce the comprehensibility of sounds in an environment. However, the efficiency of such systems is often not monitored, especially not regularly. Further, the specific type of noises that should be masked, e.g. human chatter, is often not taken into consideration.

Thus, it is an objective of the invention to provide an improved grid comprising at least one luminaire, an improved system comprising said grid and an improved method for operating a grid of at least one luminaire, which avoid the above-mentioned disadvantages. In particular, it is an objective to assess the distribution and range of specific sounds in an environment.

SUMMARY OF THE INVENTION

The object of the present invention is achieved by the solution provided in the enclosed independent claims. Advantageous implementations of the present invention are further defined in the dependent claims.

According to a first aspect, the invention relates to a grid, comprising at least one luminaire, wherein the at least one luminaire comprises one or more acoustic sensors and preferably other sensors, wherein the grid further comprises a controller supplied with the output signals of said sensors, wherein the controller is arranged for discriminating different sound categories in the output signals, including human voice sound, and to issue a sensor information signal representing at least the sound category.

This achieves the advantage that environmental information, in particular information on a type or category of ambient noise in the environment, can be collected efficiently. This information can be used to assess a distribution and range of sounds in the environment.

Integrating the sensors in the luminaires of the grid leads to a cost reduction, because components such as housing, communication means and/or power sources can be shared between the luminaires and the sensors.

Preferably, the grid comprises a plurality of luminaires, wherein each of the plurality of luminaires comprises the one or more acoustic sensors and preferably other sensors.

Preferably, the sensor information signal comprises the sound category.

In an embodiment, the sensor information signal further comprises a timestamp.

This achieves the advantage that a detected sound category can be linked to a certain time.

In this way, for instance, it can be detected during which hours human chatter occurs in the environment. This information can be forwarded by the controller by means of the sensor information signal.

In an embodiment, the sensor information signal further comprises a probability value for the sound category, an overall sound pressure and/or presence data provided by a motion sensor of the at least one luminaire This achieves the advantage that a certainty or uncertainty of the assessment of the sound category is known.

In an embodiment, the sensor information signal comprises a luminaire identifier (ID).

This achieves the advantage that the detected sound category and can be linked to the place in the environment at which the luminaire is installed. This information can be used to generate a sound map of the environment.

In embodiment, the sound categories further comprise one or more of: crowd chatter, white noise, machine noise, music, street noise, traffic noise, sudden/burst noise, or broadband non-white noise.

This achieves the advantage that the ambient sound can be classified efficiently according to its origin.

In an embodiment, the controller is arranged for forwarding the sensor information signal repetitively with a constant or a varying, especially adaptive, frequency.

This achieves the advantage that a temporal development of the presence and category of the ambient sound can be detected. In this way, for instance, it can be detected how the ambient noise changes over the day.

In particular, the controller is arranged to forward updated sensor information signals based on current output signals of the sensors with constant or varying frequency.

According to a second aspect, the invention relates to a system comprising the grid according to the first aspect of the invention, a data processing unit and a database, wherein the sensor information signal is stored in the database.

This achieves the advantage that environmental information, in particular information on a type or category of ambient noise in the environment, can be collected, forwarded and processed efficiently.

The system can further comprise a gateway configured to forward the sensor information signal to the database and/or the processing unit.

In an embodiment, the database can be analyzed, in particular by the data processing unit, for evaluating the time development of one or more sensor information signals.

This achieves the advantage that a temporal development of the presence and category of the ambient sound at different places in the environment can be determined.

In this way, for instance, it can be determined how the ambient noise in the environment of the grid changes over the day.

Preferably, the database is adapted for being analyzed by the data processing unit for evaluating the time development of one or more sensor information signals.

In an embodiment, a location of the at least one luminaire of the grid can be determined based on the evaluation of the time development of the one or more sensor information signals.

Preferably, the data processing unit is configured to determined the location of the at least one luminaire of the grid.

In an embodiment, the database can be analyzed, in particular by the data processing unit, for evaluating correlations between sensor information signals of sensors of different categories and/or different luminaires This achieves the advantage that the system has a high robustness, e.g. faulty sensor signals can be detected via comparison with signals from other sensors. In addition, this sensor fusion, i.e. the combination of different types of sensor signals from different sensors, allows determining additional information about the environment with low uncertainty.

Preferably, the database is adapted for being analyzed, in particular by a data processing unit, for evaluating correlations between sensor information signals of sensors of different categories and/or different luminaires In an embodiment, the data processing unit is configured to generate a sound map depicting a propagation and/or range of sound in an environment of the grid based on the sensor information signals stored in the database, preferably based on a k-nearest neighbor algorithm.

This achieves the advantage that the collected sensor information signals and information determined based on said signals can be visualized for a user.

In a further embodiment, the data processing unit is configured to apply a correlation algorithm on a time series of sensor information signals from different locations of the grid, in particular on sensor information signals from different luminaires of the grid. Preferably the data processing unit is configured to generate the sound map based on a results of applying the correlation algorithm on the time series.

Preferably, applying the correlation algorithm comprises applying a correlation function, such as the Pearson Product-Moment Correlation coefficient, in a matrix form. Preferably, a k-nearest neighbors or similar algorithm is used for calculating this correlation matrix. Furthermore, a moving average, smoothing and/or low pass filter can be applied to a time series progression of matrix elements of the correlation matrix.

In an embodiment, the data processing unit is configured to determine disturbance and/or privacy parameter for different locations in the environment, in particular based on the sound categories in the sensor information signals, and to include the disturbance and/or privacy parameter in the sound map.

This achieves the advantage that information on disturbance and/or privacy in the environment can be visualized efficiently.

In an embodiment, the data processing unit is configured to generate alerts based on the disturbance and/or privacy parameters, in particular based on changes of the disturbance and/or privacy parameters.

This achieves the advantage that information on disturbance and/or privacy in the environment can be used efficiently.

The above description with regard to the grid according to the first aspect of the invention is correspondingly valid for the system according to the second aspect of the invention.

According to a third aspect, the invention relates to a method for operating a grid comprising at least one luminaire, wherein the at least one luminaire comprises one or more acoustic sensors and preferably other sensors; the method comprising the steps of:
  supplying output signals of said sensors to a controller,
  discriminating different sound categories in the output signals, including human voice sound, and
  issuing a sensor information signal representing at least the sound category.

This achieves the advantage that environmental information, in particular information on a type or category of ambient noise in the environment, can be collected efficiently. This information can be used to assess a distribution and range of sounds in the environment.

The above description with regard to the grid according to the first aspect of the invention and the system according to the second aspect of the invention is correspondingly valid for the method according to the third aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1A:
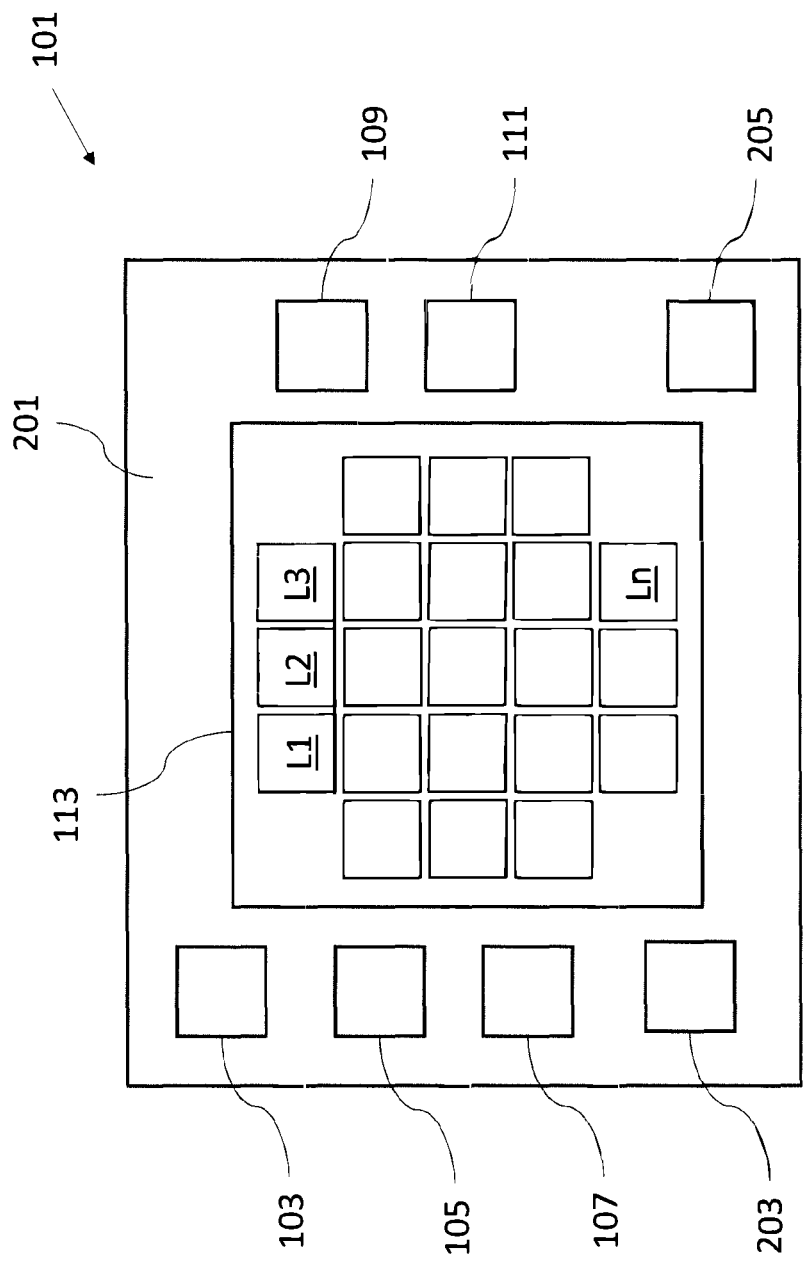
FIG. 1*a* shows a schematic diagram of a luminaire according to an embodiment.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1a shows a schematic diagram of a luminaire 101 according to an embodiment.

The luminaire 101 comprises a one or more acoustic sensors 105 and preferably further sensors 103, 107. The luminaire 101 further comprises a controller 109 supplied with the output signals of said sensors 103, 105, 107, wherein the controller 109 is arranged for discriminating different sound categories in the output signals, including human voice sound, and to issue a sensor information signal representing at least the sound category.

Figure 2:
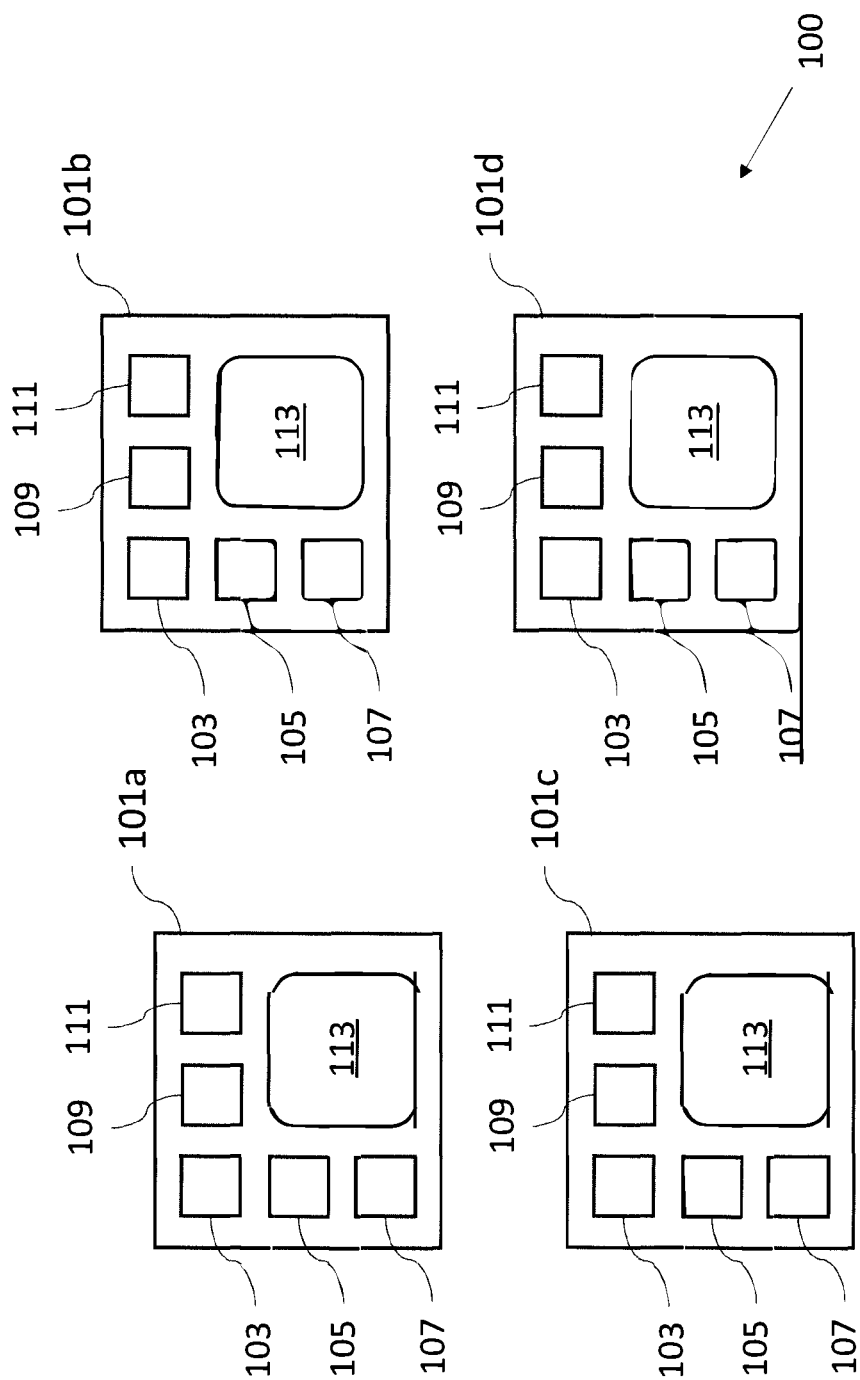
FIG. 2 shows a schematic diagram of a grid comprising at least one luminaire according to an embodiment.

The luminaire 101 can be comprised in a grid, as for instance shown in FIG. 2. The grid can comprise one or more of the luminaires 101.

Preferably, the luminaire comprises a light sensor 103, in particular a daylight sensor, and a motion sensor 107 in addition to the acoustic sensor 105.

The acoustic sensor 105 of the luminaire 101 can comprise a noise detector, in particular a microphone. For example, the acoustic sensor 105 is configured to detect a noise pressure level and/or noise patterns such as voice or burst sounds.

The motion sensor 107 can be a presence sensor. In particular, the motion sensor 107 is a Doppler based motion sensor, i.e. a sensor that detects motion based on the Doppler Effect.

The daylight sensor 103 can be configured to detect a natural light intensity, e.g. of daylight.

In particular, the sensors 103, 105, 107, in particular the acoustic sensor, can be of low technical complexity and, therefore, cheap.

The controller 109 can be a micro controller unit (MCU).

In particular, the luminaire 101 further comprises a wireless interface 111 configured to forward the sensor information signal, for instance to a gateway. The wireless interface 111 can be a Bluetooth interface and can be configured to forward the sensor information signal using the Bluetooth standard.

Preferably, the sensor information signal comprises a timestamp and/or a luminaire identifier (ID). Via the timestamp and the identifier, the sound category can be correlated to a place and time in the environment.

For example, the controller 109 is configured to forward a new sensor information signal every few milliseconds or at least every few seconds.

In particular, the sensor information signal comprises a set of sound categories or features that provide a fingerprint of the location of the luminaire 101 and a human presence probability.

In this way, a 2D sound map of the environment can be generated based on data forwarded to the central database. For instance, the 2D sound map shows noise levels, in particular volume and/or intensity, or noise categories in the environment at different times during the day. The 2D sound map can further show an overall sound pressure in the environment and/or the presence or presence probability of people, for instance determined based on the output signal of the motion sensor 107.

Preferably, the audio data is processed in the luminaire, in particular by the controller 109. Especially, no direct voice recordings are forwarded by the luminaire due to hardware restrictions in the luminaire. Thus, the privacy of people in the environment is respected and no audio recordings are stored.

Preferably, the acoustic sensor 105, in particular the microphone, is connected to the controller 109 for processing the sound, and the controller 109 is connected to a wireless interface 111 via the UART (Universal Asynchronous Receiver Transmitter) protocol, wherein the wireless interface 111 can be a low bandwidth radio interface.

In an embodiment, the controller 109 is arranged for forwarding the sensor information signal repetitively with a constant or a varying, especially adaptive, frequency. In particular, every new sensor information signal is based on a current output signal of said sensors 103, 105, 107.

The sound categories can comprise one or more of: human voice (single or few), crowd chatter, white noise, machine noise, music, street noise, traffic noise sudden/burst noise, and/or broadband non-white noise. Preferably, the sensor information signal further comprises a probability value for each sound category, an overall sound pressure and/or presence data provided by a motion sensor of the at least one luminaire Preferably, the controller 109 is executing an interference model based on a recursive or a convolutional neural network in order to discriminate and assign the sound categories.

Preferably, the luminaire 101 further comprises a light source 113. In the exemplary embodiment of FIG. 1a, the light source 113 comprises an LED array with a plurality of individual LEDs L1, . . . , Ln. For instance, the LED array comprises 60 LEDs providing a total illumination of 2200 lm.

Preferably, the sensors 103, 105, 107 and the controller 109 are arranged within a housing (not shown) of the luminaire 101, e.g. below a diffusing plate. In this way, the sensors are not protruding the visible interface and do not disturb the appearance of the luminaire 101.

The luminaire 101, as shown in FIG. 1a, may further comprises a circuit board 201, e.g. a PCT board. The sensors 103, 105, 107 and the controller 109 can be integrated in the circuit board. Preferably, also the light source 113 and the wireless interface 111 is integrated in the circuit board.

The luminaire 101 can further comprise a power supply 203, in particular a low voltage power supply (LOPS), which is arranged to provide a power supply to the light source 113, the sensors 103, 105, 107, the controller 109 and/or the wireless interface 111.

The luminaire 101 in the exemplary embodiment of FIG. 1a further comprises a driver 205, in particular a driver on board (DOB) for the light source 113.

The luminaire 101 can comprise a downlight, an area light or a linear light.

In particular, the wireless interface 111, the housing, the power supply 203, the driver 205, the circuit board 201 and/or at least one of the light sensor 103 or motion sensor 107 are optional features of the luminaire 101.

Figure 1B:
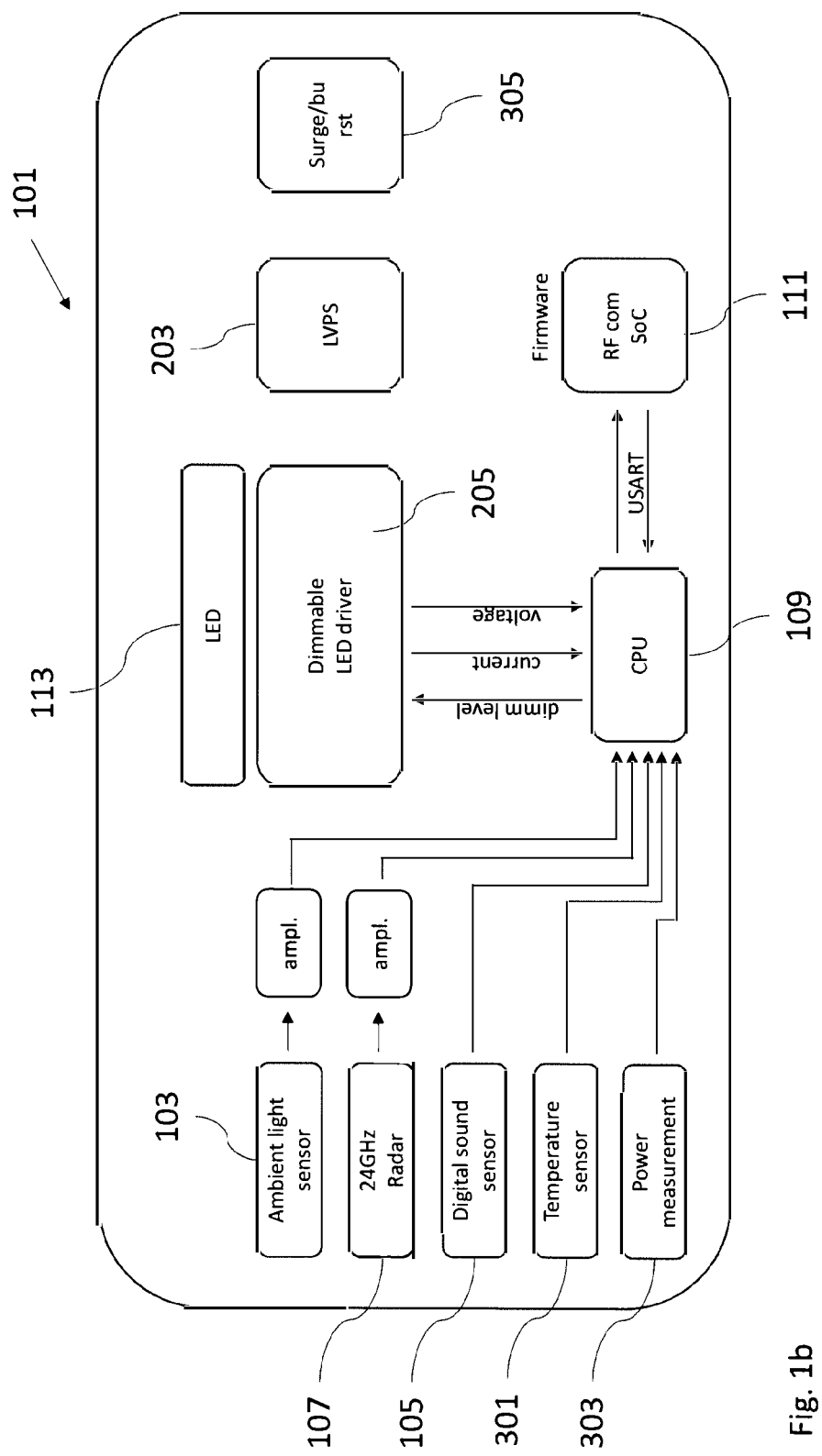
FIG. 1*b* shows a schematic diagram of a luminaire according to an embodiment.

FIG. 1b shows a schematic diagram of a luminaire 101 according to an embodiment.

In particular, the luminaire 101 shown in FIG. 1b is an exemplary embodiment of a luminaire 101a-b of the grid 100, as for example shown in FIG. 1a.

The luminaire 101 comprises the light sensor 103, the motion sensor 107, e.g. in form of a 24 GHz radar sensor, and the acoustic sensor 105, e.g. in form of a digital sound sensor.

The luminaire 101 can further comprises a temperature sensor 301 and a power measurement unit 303, e.g. for measuring a power consumption by the luminaire 101.

Furthermore, the luminaire 101 can comprises a vibration sensor (not shown), e.g. for detecting vibrations in the ceiling.

Preferably, the sensors 103, 105, 107, 301 and 303 are configured to forward sensor values to the controller 109. In FIG. 1b, the controller comprises a CPU.

The sensor values can comprise amplitudes of detected signals, for instance, a brightness value detected by the light sensor 103 or a velocity of a movement detected by the motion sensor.

The luminaire 101, as shown in FIG. 1b, comprises a dimmable LED driver 205 connected to the light source 113, wherein the light source 113 comprises LEDs. The controller 109 can be configured to control a dim level of the light source 113. The controller 109 can further be configured to receive information on a voltage or current consumption of the LEDs.

The wireless interface 111 can be configured to communicate with the controller 109 via the USART (Universal Synchronous/Asynchronous Receiver Transmitter) protocol.

The wireless interface 111 can be integrated in the luminaire 101 as a system on a chip (SoC).

The luminaire can further comprise a surge/burst protection unit 305.

FIG. 2 shows a schematic diagram of a grid 100 comprising at least one luminaire 101a-d according to an embodiment.

For example, each of the at least one luminaires 101a-d of the grid 100 in FIG. 2 corresponds to a luminaire 101 as shown in FIG. 1a.

Preferably, each of the luminaires 101a-d in the grid 100 comprises one or more acoustic sensors 105 and preferably other sensors, such as the light sensor 103, preferably the daylight sensor or motion sensor 107. Each luminaire 101a-d further comprises the controller 109.

The controller 109 can be supplied with the output signals of said sensors 103, 105, 107, wherein the controller 109 is arranged for discriminating different sound categories in the output signals, including human voice sound, and to issue a sensor information signal representing at least the sound category.

Each luminaire 101a-d can further comprise the wireless interface 111 for a communication between the controller 109 and a gateway for forwarding sensor information signals to a central database (not shown).

Preferably, each luminaire 101a-d in the grid 100 comprises a light source 113, in particular a plurality of LEDs.

Each of the luminaires 101a-d can be a downlight luminaire, a standing luminaire or an area light. In particular, the grid 100 comprises different types of luminaires at different locations in the environment.

The grid 100 can be arranged in an environment, in particular a building. Since luminaires 101a-d are typically evenly distributed over such an environment, equipping each luminaire 101a-d with sensors 103, 105, 107 leads to a good coverage of the environment with the sensors. Equipping luminaires with sensors has the additional advantage that no extra planning or commissioning for mounting external sensors in the environment has to be done.

The grid 100 can comprise multiple luminaires 101a-d equipped with the same type and number of sensors. Alternatively, luminaires 101a-d of one grid 100 may comprise different sensors.

Preferably, the distribution and propagation of ambient sound in the environment can be determined based on the sensor information signals from the luminaires 101a-d of the grid 100. Each luminaire 101a-d, in particular the controller 109 of each luminaire 101a-d, can be configured to evaluate the ratio of human voices versus other sound patterns, such as crowd chatter, white noise, machine noise etc., in the vicinity of each luminaire 101a-d. Further, each luminaires 101a-d can be configured to determine an overall sound pressure and the presence around the voice sources in its vicinity, e.g. based on the readings of radar presence sensors in the luminaires 101a-d. This information can be forwarded by means of the sensor information signals, e.g. to a central database, and can be used to generate a sound map of the environment.

Based on the information forwarded by the luminaires 101a-d, a privacy estimate in different locations of the environment can be evaluated. In particular, the following factors can thereby be taken into account: spread of noise, ratio of human voice to other patterns (e.g. chatter, white noise machine noise, music etc.), overall sound pressure, and presence around the voice sources. The evaluation results can be mapped over the locations of the luminaires 101a-d. The map can show voice probabilities, voice fingerprints, voice to white noise ratios and/or noise levels across the environment. The map can further show the location of people in the environment, e.g. based on the radar presence sensor readings. In this way, the spread and range of sounds and, thus, of information from sources to other locations in the environment can be determined and mapped.

Further, a quality assessment of locations in the environment can be performed. Thereby, an estimate of distraction by noise at different locations in the environment can be evaluated based on the following factors: noise level, probability of human voice, fingerprint of other noise sources (e.g. traffic noise, music etc.), and human presence. The evaluation results can again be mapped over the locations of the luminaires 101a-d. The map can show voice probabilities, noise fingerprints, voice to white noise ratios and/or noise levels across the environment. The map can further show the location of people in the environment.

The above mentioned evaluation results can be mapped over the luminaire grid 100. Thereby, noise sources can be determined as the locations in the environment where a sound with the highest intensity of one or several categories (e.g. voice) is detected, either at a certain time (snapshot) or over a time series.

In particular, the sound map can be generated based on a k-nearest neighbor algorithm or a similar method. The map can be alert generated if a threshold sound value is detected, or by a control of a white noise generator or other sound masking device.

Figure 3:
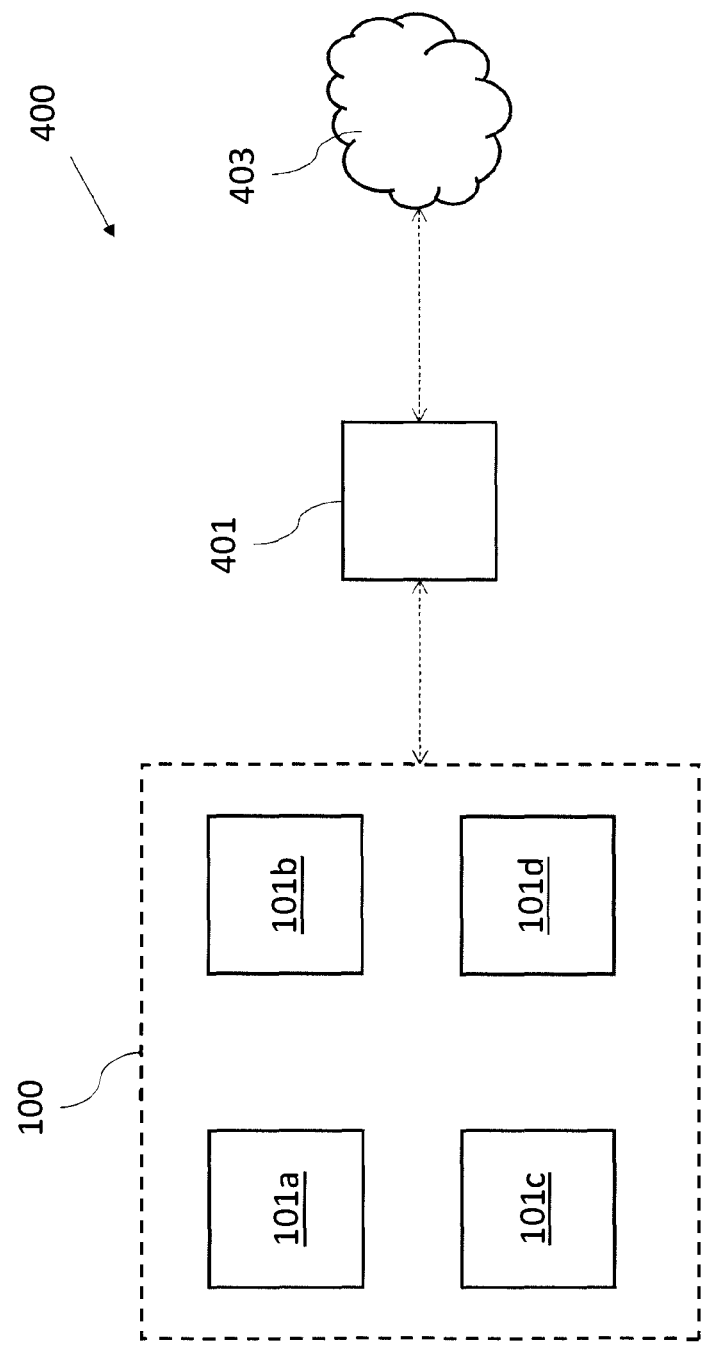
FIG. 3 shows a schematic diagram of a system comprising a grid of at least one luminaire according to an embodiment.

FIG. 3 shows a schematic diagram of a system 400 comprising a grid 100, wherein the grid 100 of at least one luminaire 101a-d according to an embodiment.

For example, the grid 100 of the system 400 shown in FIG. 3 corresponds to a grid 100 as shown in FIG. 2.

The system 400 further comprises the wireless gateway 401 and the database 403, wherein the sensor information signal 130 from the at least one luminaire 101a-d is stored in the database 403. The system 400 can further comprise a data processing unit 402.

Preferably, the wireless interface 111 of each one of the luminaires 101*a*-*d* in the grid 100 is configured to forwarding sensor information signals from the sensors 103, 105, 107 of the respective luminaire 101*a*-*d* to the wireless gateway 401.

The wireless gateway 401 can be configured to forward the sensor information signals to the central database 403. The wireless gateway 401 can be a communication device, such as a smartphone.

The central database 403 can be a memory of a data-processing device, e.g. a computer. Alternatively, the central database 403 can be a cloud storage.

Preferably, the central database 403, in particular the sensor information signals stored in the central database 403, can be analyzed for evaluating the time development of one or more sensor information signals.

Alternatively, the data processing unit 402 can be configured to receive the sensor information signals and to analyze the sensor information signals directly.

The analysis of the sensor information signals can be used for various application. For example, the system 400 can be a street lighting system. If people are detected via a certain sound category of the output signal of the acoustic sensor 105, e.g. speech noise or steps, the system 400 can be configured to increase a brightness level of respective luminaires 101*a*-*d*. If an approaching vehicle is detected by the system 400, e.g. by detecting the sound category "tire noise", pedestrians in the surrounding can be warned, e.g. by changing the street lighting or transmitting an information signal, for instance via Bluetooth.

The system 400, in particular the data processing unit 402, can further be configured to detect an emergency situation based on the sensor information signals. For instance, the system 400 can be configured to detect events such as a suspected burglary by detecting a sound of the category "shattering glass", or a medical emergency, by detecting a sound of the category "falling person". As a reaction, the system 400 can be configure to increase the brightness or transmit an alarm signal to other connected emergency alarm systems.

In particular, a location of the at least one luminaire 101*a*-*d* of the grid 100 can be determined based on the evaluation of the time development of the one or more sensor information signals 130.

Further, the central database 403 can be analyzed for evaluating correlations between sensor information signals of sensors 103, 105, 107 of different categories and/or different luminaires.

Preferably, the sound map described above is generated based on the analysis of the database 403.

In particular, the data processing unit 402 is configured to generate a sound map depicting a propagation and/or range of sound in an environment of the grid 100 based on the sensor information signals stored in the database 403.

The data processing unit 402 can be configured to generate the sound map at least partially based on a k-nearest neighbor algorithm.

Preferably, the data processing unit 402 is further configured to determine disturbance and/or privacy parameter for different locations in the environment, in particular based on the sound categories in the sensor information signals, and to include the disturbance and/or privacy parameter in the sound map.

The data processing unit 402 can be configured to generate alerts based on the disturbance and/or privacy parameters, in particular based on changes of the disturbance and/or privacy parameters.

Figure 4:
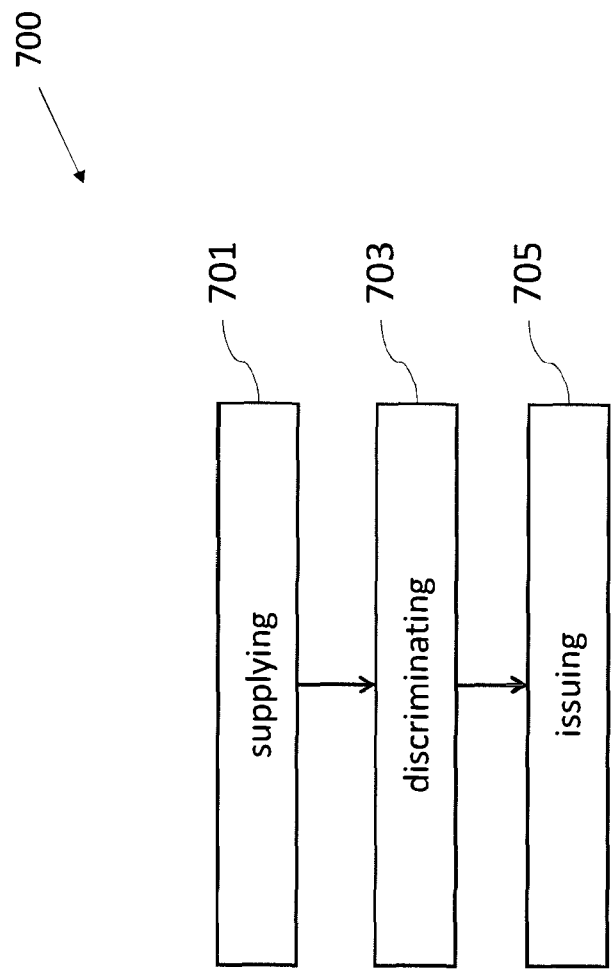
FIG. 4 shows a schematic diagram of a method for operating a grid comprising at least one luminaire.

FIG. 4 shows a schematic diagram of a method 700 for operating a grid 100 comprising at least one luminaire 101*a*-*d*. In particular, the at least one luminaire 101*a*-*d* comprises one or more acoustic sensors 105 and preferably other sensors 103, 107.

The method 700 comprising the steps of:
supplying 701 output signals of said sensors 103, 105, 107 to the controller 109,
discriminating 703 different sound categories in the output signals, including human voice sound, and
issuing 705 the sensor information signal 130 representing at least the sound category.

Figure 5:
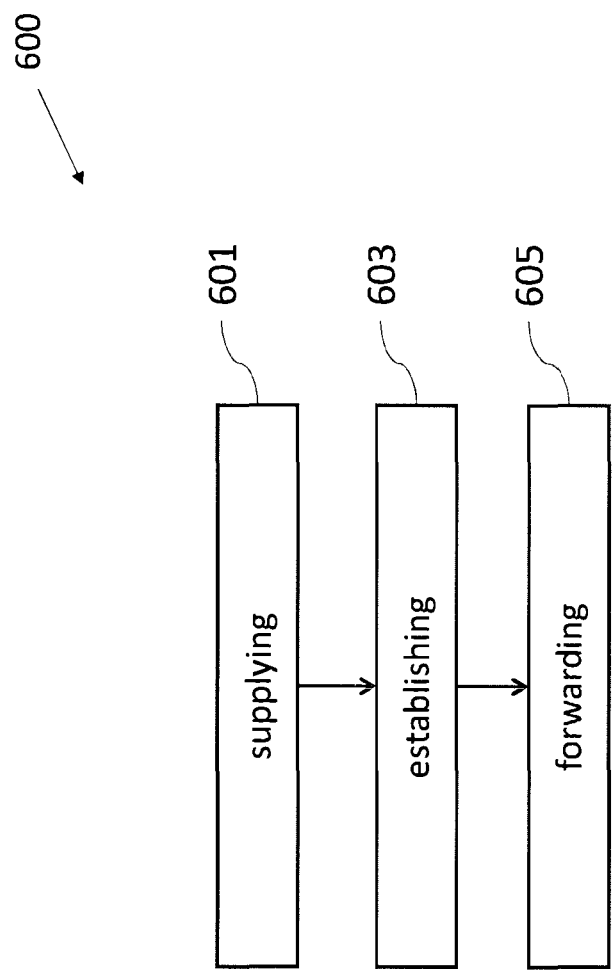
FIG. 5 shows a schematic diagram of a method for operating a grid of a plurality of luminaires.

FIG. 5 shows a schematic diagram of a method 600 for operating a grid 100 of a plurality of luminaires 101*a*-*d*.

The method 600 comprises the steps of:
supplying 601 output signals of luminaires 103, 105, 107 to the controller 109,
establishing 603 a communication connection between the controller 109 and the gateway 401, and
forwarding sensor information signals 130 to the data processing unit 402 and/or the central database 403 by means of the gateway 401.

In particular, the grid 100 of the plurality of luminaires 101*a*-*d* of the methods 700, 600 corresponds to the grid 100 as depicted in FIG. 2.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. A system (400) comprising a grid (100) arranged in a building, a data processing unit (402) and a database (403), wherein
the grid (100) comprises:
a plurality of luminaires (101*a*-*d*), wherein each luminaire (101*a*-*d*) comprises one or more acoustic sensors (105), other sensors (103, 107) and a controller (109) supplied with the output signals of said sensors (103, 105, 107), wherein the controller (109) is arranged for discriminating different sound categories in the output signals, including human voice sound, and to issue a sensor information signal representing at least the sound category;
wherein the sensor information signals (130) are transmitted from the controller (109) in each luminaire (101*a*-*d*) and stored in the database (403), the data processing unit is configured to analyze the database to evaluate correlations between sensor information signals of sensors (103, 105, 107) of different categories and different luminaires (101*a-d*), and the data processing unit (402) is configured to generate a two-dimensional sound map depicting a propagation and/or range of sound in an environment of the grid (100) based on the sensor information signals stored in the database (403);

wherein the sensor information signal comprises a probability value for the sound category, an overall sound pressure and presence data provided by a radar motion sensor of each luminaire (101*a-d*); and wherein the data processing unit (402) is configured to determine a privacy parameter for one or more detected sounds in one or more different locations in the building in which the grid is arranged and to include the privacy parameter in the sound map, wherein the detected sound in a location is discriminated between human voice and noise and based on the voice-to-noise ratio and presence data from the radar motion sensor.

2. The system (400) of claim 1, wherein the sensor information signal further comprises a timestamp.

3. The system (400) of claim 1, wherein the sensor information signal comprises a luminaire identifier.

4. The system (400) of claim 1, wherein the sound categories further comprise one or more of: crowd chatter, white noise, machine noise, music, street noise, traffic noise, sudden/burst noise, or broadband non-white noise.

5. The system (400) of claim 1, wherein the controller (109) is arranged for forwarding the sensor information signal repetitively with a constant or a varying frequency.

6. The system (400) of claim 1, wherein the database (403) can be analyzed for evaluating the time development of one or more sensor information signals.

7. The system (400) of claim 6, wherein a location of each luminaire (101*a-d*) of the grid (100) is automatically determined based on the evaluation of the time development of the one or more sensor information signals.

8. The system (400) of claim 1, wherein the data processing unit (402) is configured to generate alerts based on changes of the privacy parameters.

9. The system (400) of claim 1 further comprising a wireless gateway (401), wherein each luminaire in the grid has a wireless interface and the controller for the respective luminaire transmits the sensor information signals wirelessly using wireless interface on the luminaire to the wireless gateway (401), and the wireless gateway is configured to forward the sensor information signals to the central database (403).

10. The system (400) of claim 1 wherein the controllers (109) execute an interference model based on a recursive or a convolutional neural network in order to discriminate and assign sound categories.

11. The system (400) of claim 1 wherein the acoustic sensor in each luminaire is a digital sound sensor.

* * * * *